United States Patent [19]

Tutu et al.

[11] Patent Number: 5,049,352
[45] Date of Patent: Sep. 17, 1991

[54] NUCLEAR REACTOR MELT-RETENTION STRUCTURE TO MITIGATE DIRECT CONTAINMENT HEATING

[75] Inventors: Narinder K. Tutu, Manorville; Theodore Ginsberg, East Setauket; John R. Klages, Mattituck, all of N.Y.

[73] Assignee: Associated Universities, Inc., Washington, D.C.

[21] Appl. No.: 598,846

[22] Filed: Oct. 15, 1990

[51] Int. Cl.$^5$ ............................................. G21C 9/00
[52] U.S. Cl. ................................................. 376/280
[58] Field of Search ............... 376/280, 279, 273, 274, 376/293, 294, 295, 389, 399, 283

[56] References Cited

U.S. PATENT DOCUMENTS

| | | | |
|---|---|---|---|
| 3,205,145 | 9/1965 | Margen | 376/273 |
| 3,232,843 | 2/1966 | Went et al. | 376/283 |
| 3,668,069 | 6/1972 | Ullrich et al. | 376/293 |
| 3,719,556 | 3/1973 | Snyder, Jr. et al. | 376/280 |
| 3,889,707 | 6/1975 | Fay et al. | 376/283 |
| 3,930,939 | 1/1976 | Bittermann et al. | 376/280 |
| 3,964,966 | 6/1976 | Lampe | 376/280 |
| 4,000,038 | 12/1976 | Moser | 376/273 |
| 4,003,785 | 1/1977 | Rau et al. | 376/280 |
| 4,045,284 | 8/1977 | Rosewell | 376/280 |
| 4,073,682 | 2/1978 | Barleon et al. | 376/280 |
| 4,121,970 | 10/1978 | Albrecht et al. | 376/280 |
| 4,280,872 | 7/1981 | Ferrari et al. | 376/280 |
| 4,300,983 | 11/1981 | Dalle Donne et al. | 376/280 |
| 4,442,065 | 4/1984 | Latter et al. | 376/280 |
| 4,634,525 | 1/1987 | Yant | 376/313 |
| 4,643,870 | 2/1987 | Hunsbedt et al. | 376/280 |

FOREIGN PATENT DOCUMENTS 1589486 2/1970 Fed. Rep. of Germany ...... 376/293

Primary Examiner—Daniel D. Wasil
Attorney, Agent, or Firm—Margaret C. Bogosian

[57] ABSTRACT

A light water nuclear reactor melt-retention structure to mitigate the extent of direct containment heating of the reactor containment building. The structure includes a retention chamber for retaining molten core material away from the upper regions of the reactor containment building when a severe accident causes the bottom of the pressure vessel of the reactor to fail and discharge such molten material under high pressure through the reactor cavity into the retention chamber. In combination with the melt-retention chamber there is provided a passageway that includes molten core droplet deflector vanes and has gas vent means in its upper surface, which means are operable to deflect molten core droplets into the retention chamber while allowing high pressure steam and gases to be vented into the upper regions of the containment building. A plurality of platforms are mounted within the passageway and the melt-retention structure to direct the flow of molten core material and help retain it within the melt-retention chamber. In addition, ribs are mounted at spaced positions on the floor of the melt-retention chamber, and grid means are positioned at the entrance side of the retention chamber. The grid means develop gas back pressure that helps separate the molten core droplets from discharged high pressure steam and gases, thereby forcing the steam and gases to vent into the upper regions of the reactor containment building.

13 Claims, 3 Drawing Sheets

NUCLEAR REACTOR MELT-RETENTION STRUCTURE TO MITIGATE DIRECT CONTAINMENT HEATING

This invention was made with Government support under contract number DE-ACO2-76CHOOO16, between the U.S. Department of Energy and Associated Universities, Inc. The Government has certain rights in the invention.

The invention relates to a nuclear reactor melt-retention structure for use with water cooled reactors and, more particularly, relates to a melt-retention structure that is effective during a high pressure melt ejection accident within a water cooled reactor to mitigate direct containment heating within the reactor containment building.

BACKGROUND

The present invention is useful primarily with water cooled nuclear reactors. It differs from known "core catcher" systems that are used in reactors for dealing with long term decay heat removal when the cores of liquid metal reactors or gas cooled reactors are disrupted, causing a relatively low pressure or benign-condition downward flow from the reactor of molten core material under the force of gravity. It is also recognized that nuclear reactor design concepts have been proposed which include a variety of structure designs for "in-vessel" core catchers that are normally positioned directly below the nuclear fuel elements of the reactor, or are otherwise situated within the reactor pressure vessel. Unlike such known prior reactor the present invention provides a melt-retention structure that is positioned externally from the reactor pressure vessel of a water-cooled nuclear reactor. This invention is designed to operate under conditions imposed as a result of a reactor core meltdown under high-pressure vessel conditions, followed by failure of the lower vessel boundary. This invention would operate under the very high velocities that may prevail immediately following the initial discharge of molten core material from the reactor vessel if such an accident should occur.

SUMMARY OF THE INVENTION

A primary object of the invention is to provide a nuclear reactor melt-retention structure that operates to mitigate direct containment heating within the reactor containment building if an accident occurs that results in a high pressure discharge of molten fuel core materials, steam and gases, including flammable hydrogen, from the reactor pressure vessel.

Another object of the invention is to provide a nuclear reactor melt-retention structure that is operable to quickly and effectively separate high pressure steam from the molten fuel core materials that are discharged during an accident that melts through the bottom of a reactor pressure vessel, whereby the molten core materials are retained under relatively low gas velocity conditions within a retention chamber while steam and flammable gases are vented into the reactor containment building.

A further object of the invention is to provide a nuclear reactor melt-retention structure that includes flow control means for separating molten core material from steam and hot gases, and that are further effective for retaining the molten core materials in a retention chamber in a manner such that they are not re-entrained with the flow of steam and gases that are vented into the reactor containment building during an accident that causes the pressure vessel to fail.

Additional objects and advantages of the invention will become apparent from a reading of the disclosure presented herein, considered in conjunction with the accompanying drawings.

In a preferred form of the invention a nuclear reactor melt-retention structure is provided in which a melt-retention chamber is provided in combination with a passageway that extends between it and the portion of the reactor cavity directly underneath the reactor pressure vessel. The melt-retention chamber is made to have a flow area that is substantially greater than the flow area in said passageway. A plurality of platforms and ribs are mounted respectively on the sidewalls and the bottom surface of the melt-retention chamber to restrain molten core materials in the chamber from being re-entrained into steam or high pressure gases flowing over the molten core materials. Also mounted within the chamber is a grid that is effective to have passed through it high pressure gases that flow from the reactor pressure vessel through said passageway and into the retention chamber. As the gases pass through the grid it diminishes the pressure of the gases allowed into the retention chamber, while increasing back-pressure on the gases up-stream from the grid to enhance venting them into the upper region of the reactor containment building. Suitable gas vent means are provided in the upper surface of said passageway to provide communication between it and the upper region of the containment building. A plurality of baffles are mounted adjacent to the upper surface of the passageway and are arranged to be effective to direct molten core material away from the vent means and toward the melt-retention chamber. Finally, a platform is positioned on the bottom surface of said passageway, directly beneath the reactor pressure vessel, and is effective to help separate molten fuel from high pressure steam and gases that are discharged from the reactor pressure vessel during any severe accident that causes the bottom portion of the pressure vessel to fail.

DETAILED DESCRIPTION OF THE PREFERRED EMBODIMENT

Figure 1:
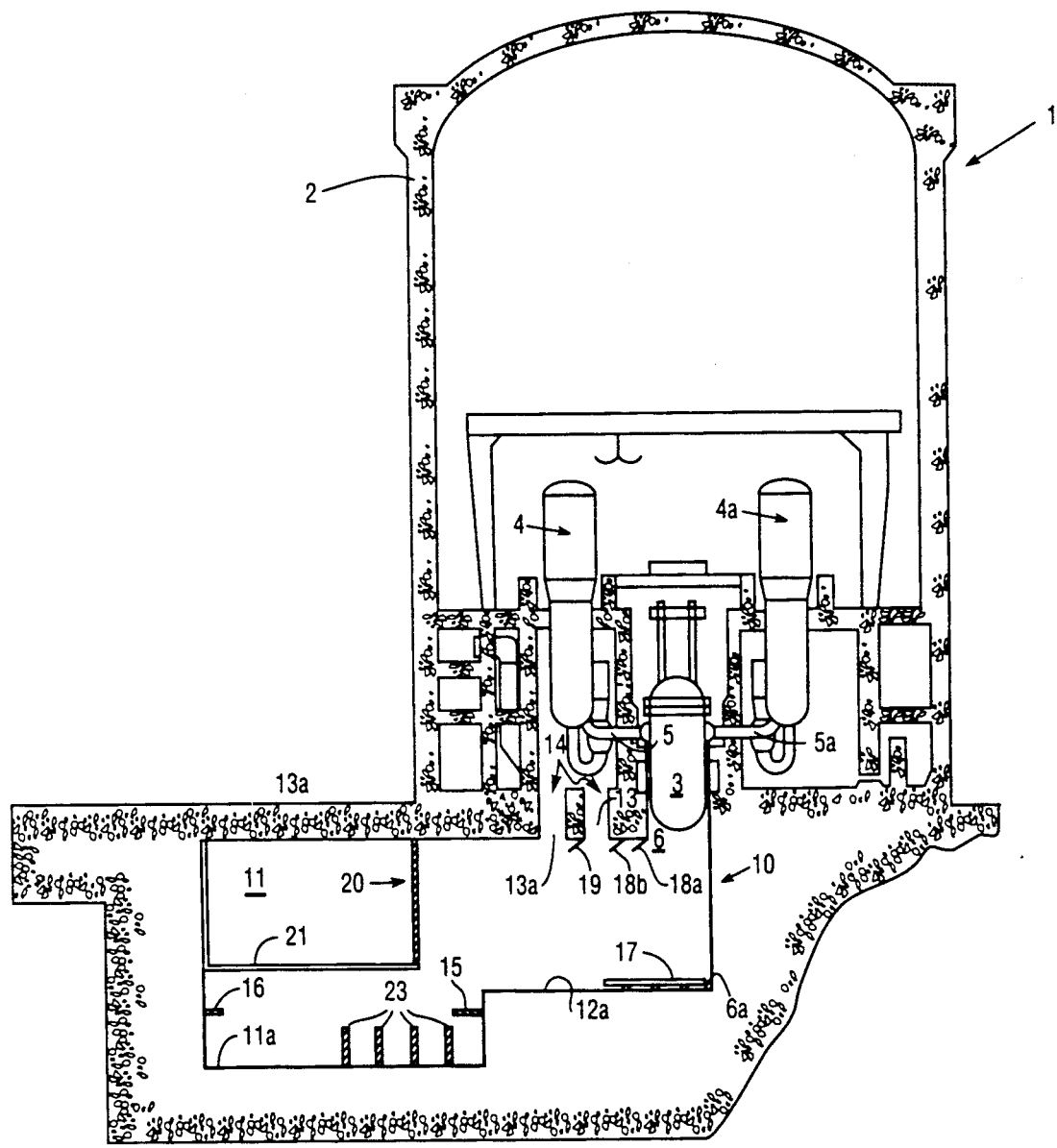
FIG. 1 is a side plan view, partly in cross section along a vertical mid-plane, schematically illustrating (cavity and containment housing not to same scale) a pressurized water nuclear reactor in combination with a reactor cavity melt-retention structure. The structure separates molten core materials from steam and gases to retain the core materials in a retention chamber while allowing the steam and high pressure gases to be vented into the reactor containment building during a high pressure melt ejection accident, according to the present invention.

The preferred embodiment of the invention described herein is schematically illustrated in FIG. 1 in its operating relationship to a relatively conventional pressurized water nuclear reactor facility 1. The reactor 1 includes a conventional concrete containment building 2 within which there is mounted a pressurized nuclear fuel core reactor vessel 3 and steam generators 4 and 4a that are, respectively, connected by pipes 5 and 5a to the pressurized reactor 3. Beneath the reactor pressure vessel 3 there is provided a suitable reactor cavity 6 that is adapted to receive molten core materials that would be forced from the reactor vessel 3 in the event of a severe reactor accident in which the nuclear fuel core within the pressure vessel 3 melts and flows to the bottom of the reactor vessel, which it either melts or penetrates then flows into the reactor cavity 6. During such an accidental fuel core meltdown, the pressure within the reactor vessel can exceed 1,000 lbs/sq. inch; thus, the molten reactor fuel and other debris, including steam, which is expelled from the pressure vessel 3 into the core cavity 6 is difficult to retain under reasonable control.

The direct containment heating (DCH) involves the uncontrolled mixing of discharged hot molten fuel core materials and steam with the gases (steam and air) in the containment building. The resulting exothermic chemical reactions and thermal energy transfer from the hot molten material to the gas atmosphere and would rapidly raise the temperature and pressure in the containment building. A possible consequence of "direct containment heating" is that the pressure within the containment building would be rapidly raised to a level for which it was not designed. In the event that the containment building should fail, radioactive material would be released to the environment. In the event of such a DCH accident, the discharge of steam under high pressure from the reactor vessel 3 into the reactor cavity 6, which is near atmospheric pressure, would cause the discharged steam to travel at very high velocity. The high velocity gases may fragment the molten fuel core into small droplets that are carried by the steam and gases through the reactor cavity into the upper region of containment building 2. The high temperature molten droplets interact with the gases in the containment building to heat them, and further react exothermically with the steam to produce hydrogen. As that hydrogen is transported into the oxygen rich upper containment area of the containment housing, it burns, releasing additional energy and further heating the atmosphere within the containment building 2. The direct containment heating accident scenario is currently under study by scientists within the nuclear community, but is still not fully understood.

One of the purposes of the present invention is to reduce the extent of direct containment heating in the event that such an accident would occur. That object is achieved by the invention by arranging it to operate to contain the great bulk of discharged molten reactor core materials in a relatively low-pressure melt-retention chamber that sits underneath the reactor vessel, and is partially isolated from, the remainder of the containment building 2. Calculations suggest that the very high pressure discharge of molten core materials and steam from the pressure vessel of a reactor in such a melt down accident will be completed during the first 20 to 30 seconds after the initial failure of the bottom of the reactor pressure vessel. It is during this initial period of such an accident that it is most likely to have molten reactor core droplets entrained with the escaping steam and gases and thereby carried into the reactor containment building of the reactor. The major purpose of the present invention is to provide a melt-retention structure that is effective during that initial time period of high pressure ejection of molten core materials to direct the flow of discharged steam and molten core droplets so as to prevent the steam from transporting a damaging quantity of the molten core materials from the failed pressure vessel of the reactor into the upper compartments of the reactor containment building. By thus directing the flows of steam and molten core materials, the direct containment heating of the atmosphere of the reactor containment building is significantly reduced, thereby reducing the likelihood of its being ruptured.

In the lower portion of FIG. 1, below the depicted nuclear reactor pressure vessel 3, there is schematically illustrated a reactor melt-retention structure that embodies the characteristic features of the present invention and functions to retain melted core material within a melt retention chamber to mitigate or avoid damage that would otherwise result from excessive direct containment heating of the atmosphere in the reactor containment building 2. As shown and described herein, the nuclear reactor melt-retention structure 10 of the invention is adapted to be positioned within the concrete structure of the containment building 2. The nuclear reactor melt-retention structure 10 comprises a melt-retention chamber 11 and a passageway 12 that extends between the cavity region 6 directly beneath the pressure vessel and one side of the melt-retention chamber 11. In the preferred embodiment, the wall, roof and floor structures of the retention chamber 11 and the passageway 12 are formed of concrete similar to that used to make the reactor containment building 2. Other suitable materials can be used for certain of those components, if desired, in practicing alternative applications of the invention.

Figure 2:
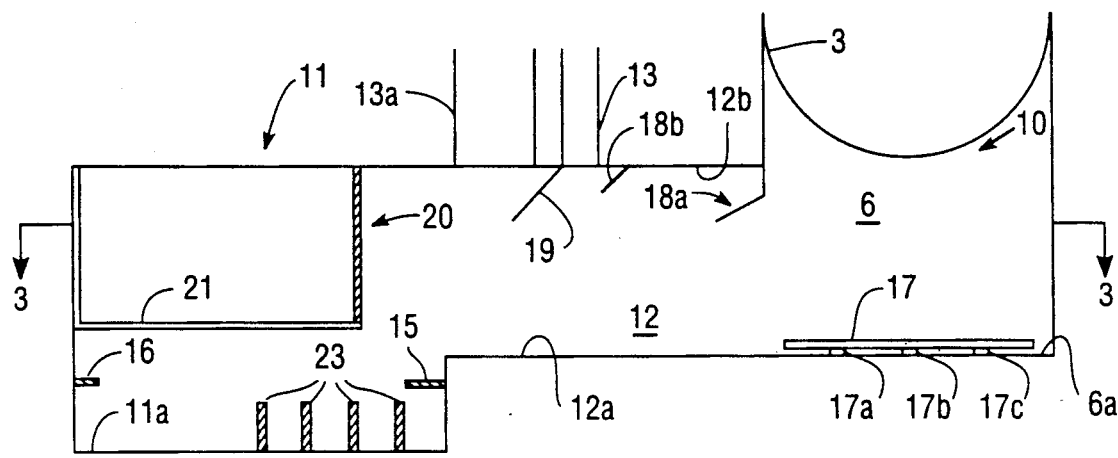
FIG. 2 is a schematic side view diagram, partly in cross section, showing the nuclear reactor melt-retention structure of the invention in relation to a portion of a reactor pressure vessel, such as that illustrated in FIG. 1.
Figure 3:
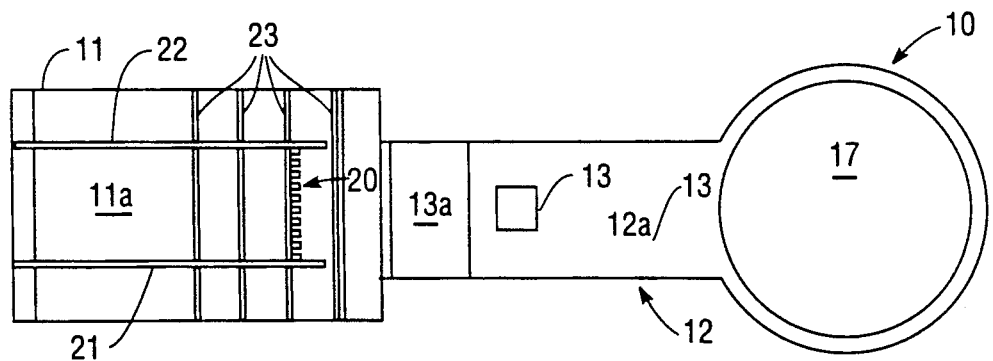
FIG. 3 is a schematic top plan view diagram of the nuclear reactor melt-retention structure illustrated schematically in FIG. 2, taken along the plane 3—3 shown in FIG. 2.

As can be seen in FIG. 1, and as is illustrated in greater detail in the side view and top plan view of FIGS. 2 and 3, the passageway 12 extends between the cavity region 6 just beneath the reactor pressure vessel and one side of the melt-retention chamber 11, which is essentially open to the passageway. To provide a means for quickly venting high pressure steam and gases from the passageway 12, the roof, or uppermost wall means, of the passageway includes vent means 13 and 13a in the upper wall portion thereof. The vent means are in communication with a gas escape channel 14 through the floor of the reactor containment building 2. That arrangement enables gas and steam that are discharged into the bottom of the reactor core cavity 6 in a meltdown accident that ruptures the bottom of the reactor pressure vessel 3 to be discharged through the passageway 12 and the vent means 13, 13a and into the gas escape channel 14, from whence they escape into the upper portion of the containment housing 2.

In order to provide means for retaining the molten core materials discharged from the melted core during such a reactor accident, the floor 11a of the melt-retention chamber 11 is positioned a predetermined distance below the bottom wall 12a of passageway 12, whereby molten materials discharged from the reactor cavity 6 will flow through the passageway into the lower portion of melt retention chamber 11 and be retained in that lower portion by the force of gravity, as gas discharged from the core cavity is vented into the containment building 2.

In order to enhance the retention of molten core material within the chamber 11, following such a meltdown accident, first and second platforms 15 and 16 are mounted within the retention chamber, respectively, adjacent to the side walls thereof that are nearest to and farthest from the passageway 12. The platforms 15 and 16 are located at a selected height above the floor or bottom 11a of the chamber 11 such that the platforms are at least slightly below the bottom wall or floor 12a of the passageway 12, as is best seen in FIG. 2. This location and use of the platforms 15 and 16 makes them effective to shield the molten core material that is retained in the bottom part of chamber 11, below the platforms, from direct impingment by steam and gas flowing from the reactor cavity 6.

In order to further enhance the movement of molten core material into the chamber 11, while limiting the entrainment of molten droplets in the high pressure steam and gases discharged from the ruptured pressure vessel, a third platform 17 is mounted in the reactor cavity 6 above the bottom wall thereof and directly below the reactor pressure vessel 3. This third platform is made effective to shield the molten core material on the floor 6a from the flow of high pressure gases and steam that are discharged from a ruptured reactor pressure vessel 3, thereby reducing both the entrainment of melt droplets, and the generation of hydrogen due to reduced steam-melt mixing. In this embodiment of the invention the first, second and third platforms, 15, 16 and 17 are formed of concrete and are mounted in their respective positions by any suitable conventional means. For example, the third platform 17 is mounted on a plurality of concrete blocks 17a, 17b, and 17c, as best seen in FIG. 2. These blocks are made effective to space the platform 17 about eight inches to fifteen inches above the floor 6a of the reactor cavity 6.

In order to assure further separation of the high pressure gases and steam from the molten core material discharged from the reactor cavity 6 through passageway 12, at least one reflector vane 18 is mounted in the passageway 12 adjacent to the top wall 12b thereof. The reflector vane 18a is located between the core cavity 6 and the vent means 13, 13a so that the reflector vane is effective to deflect particles of molten core materials away from the vent means, thereby to cause the deflected molten core material to flow through the passageway toward the melt-retention chamber 11, while gases and steam are allowed to escape through the vent means into the reactor containment building 2. This embodiment actually includes a plurality of deflector means, including the further deflector vanes 18b and 19, so that each of the deflector vanes 18a, 18b, and 19 is mounted in the passageway 12 adjacent to its top wall, at spaced apart points thereon, such that each of the vanes is located between the reactor core cavity 6 and at least one of the vent means 13 or 13a.

The desired separation of the high pressure gases and steam that are to be vented into the upper region of the containment building 2, from the molten core droplets that are to be retained in retention chamber 11, is further enhanced with the apparatus of the present invention by providing a grid means 20 that is made operable to have passed through it part of the gas flowing from the passageway 12 into the upper portion of retention chamber 11. Grid means 20 also operates to diminish the velocity of the discharged gases passing through it sufficiently to cause a back pressure in the passageway 12. That back pressure facilitates movement of the gas into the vents 13 and 13a and forces it through escape channel 14 and the vents into the containment building 2. Preferably the grid means 20 comprises a plurality of beam members (also generally identified by the number 20) and best seen in FIGS. 1 and 3. Each of the beam members 20 is a concrete column that is about 5 inches to 8 inches in width and depth, measured in the direction of gas flow into the retention chamber 11. The beam members 20 are supported in substantially parallel relation to one another and the combined surface area of the beam members facing the passageway 12 is made about equal to the combined area between the beam members, transverse to the flow of gases discharged past the beam members, into the retention chamber 11. Further, in this embodiment, the surface area of the grid beam members, combined with the areas between those members 20, is about equal to the area of the plane through the passageway 12 transverse to the flow of discharged gases as it approaches the grid means. By thus slowing the gases and steam that pass the grid means 20, the percentage of molten droplets reentrained by that gas from the walls or floor of the melt retention chamber 11, where most of the melt droplets are deposited, is greatly reduced so that a greater portion of such molten material is retained in the chamber 11, as desired.

The beam members 20 are mounted by being supported in a suitable conventional manner to the roof or the upper wall surface of the retention chamber 11, and by being secured at their bottom extremities to support bars 21 and 22, which may be formed of concrete or any other suitable structural material. In order to keep the beam members 20 spaced apart at their bottom extremities, a reinforced concrete beam or other means may be attached to the beam members 20 and to the ends of the bars 21 and 22, as is illustrated on FIG. 1.

A plurality of vertically extending ribs 23 are mounted in any suitable conventional manner adjacent to the bottom surface 11a of melt-retention chamber 11, between the side walls thereof. The ribs 23 are designed to be effective to confine molten core material that is collected between the ribs, within the retention chamber 11, when high pressure gases and steam that are discharged from the reactor vessel 3 are passed over the surface of such material and the upper edges of the ribs. In the form of the invention illustrated herein, each of the ribs 23 extends above the bottom surface 11a of chamber 11 a distance about equal to ⅔ of the selected height that the above-mentioned first and second platforms 15 and 16 are mounted above the bottom surface 11a of that chamber 11. It should be understood that in alternative embodiments of the invention different numbers of ribs could be used.

Each of the ribs 23 is preferably mounted in a relationship so that they are about parallel to one another and are spaced apart a distance that is about equal to the height of the individual ribs. Such an arrangement has been found to be particularly effective in preventing the high pressure steam and gases flowing from the passageway 12 from re-entraining molten droplets from the molten materials collected between the ribs 13, thereby to prevent such re-trained core materials from increasing the direct containment heating problem that could result in possible undesirable pressure build up within the containment building 2.

Finally, it should be recognized that the flow area of the melt-retention chamber 11 is preferably greater than the flow area of the passageway 12. Such a relationship is effective to help decelerate the high velocity gases and steam within the melt retention chamber 11 that are discharged when the pressure vessel 3 fails in a severe nuclear accident situation.

Figure 4:
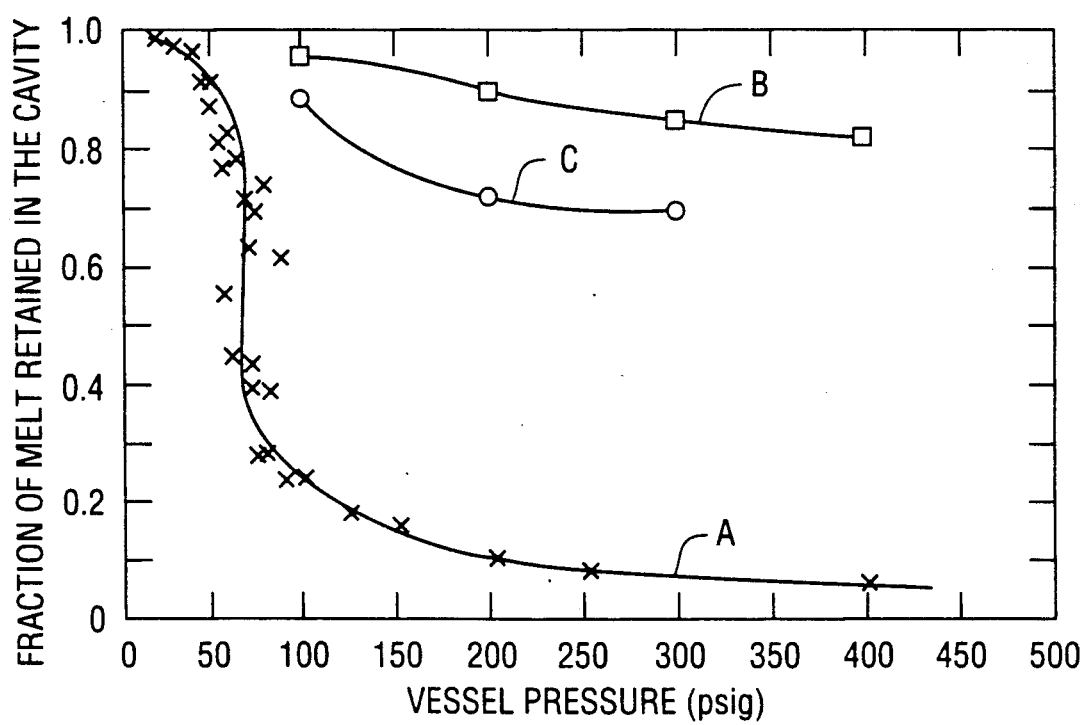
FIG. 4 is a graph showing test results obtained on a nuclear reactor melt-retention structure model of the invention, and plotting the fraction of retained molten fuel core material simulant as a function of the simulated reactor pressure vessel pressure in pounds per square inch; with curve A showing the results obtained with a model of a different type of prior art reactor cavity model, curve B showing the results for a model of the preferred embodiment of a reactor melt-retention structure of the invention, and curve C showing the results when the baffles, grid and ribs of the preferred embodiment of the invention are removed from the melt-retention structure of the invention.

A model of the nuclear reactor melt-retention structure of the invention was constructed and tested in the "High Pressure Melt Ejection Facility" that is in operation at Brookhaven National Laboratory, Upton, N.Y. FIG. 4 of the drawing shows the test results obtained during these experiments. For comparison purposes, a scale model nuclear reactor cavity of typical design was tested in a simulated meltdown and rupture of a reactor pressure vessel that would cause high pressure gases and steam to flow through its reactor cavity. The results of that test are plotted as curve A in FIG. 4 to show the fraction of melt that is retained within the cavity model at the end of the simulated melt ejection accident, versus the driving discharge gas pressure. Curve B in FIG. 4 shows the results obtained for a similarly simulated melt ejection accident, wherein the discharged gases and steam flow from a reactor cavity that is arranged in combination with the melt-retention structure of the invention. Thus, the molten core materials were retained in the melt-retention chamber 11, while the gases and high pressure steam were vented. It is clear from a comparison of the curves A and B that there is a dramatic improvement in the melt retentive capabilities of the present invention relative to prior art reactor cavity discharge means such as those available in the "typical" type reactor cavity.

In order to further compare the effectiveness of the various features of the present invention relative to prior art reactor structures, a test was performed with the passageway 12 and melt-retention chamber 11 of the melt-retention structure of the tested model of the invention being modified by removing from them the third platform 17, deflector vanes 18a, 18b, and 19 and the grid means 20. The test results obtained with that modified arrangement of the melt-retentive structure of the invention are reflected in curve C in FIG. 4. Curve C shows that about 70% of the discharged molten material was retained in the melt-retention chamber 11, versus the retention of about 85% of such molten material in the chamber 11 when the platform 17, deflector vanes 18a, 18b, and 19 and grid means 20 are included within the nuclear reactor melt-retention structure, as reflected by the test results shown in curve B in FIG. 4.

It will be apparent from the foregoing description of the invention, considered in conjunction with the accompany drawings, that various alternative embodiments and modifications of it may be made by those skilled in the art without departing from the intent or scope of the invention; thus, it is our intention to define the true limits of the invention in the following claims.

We claim:

1. A nuclear reactor melt-retention structure that functions to retain molten core material within a melt retention chamber to mitigate the extent of direct containment heating, said structure being adapted to be positioned within or adjacent to a pressurized or boiling water nuclear reactor containment building at a location such that at least a portion of said melt retention structure is lower than and to one side of the nuclear reactor pressure vessel, and such that said structure is adjacent to a gas escape channel means that communicates between the reactor cavity and the containment building of the reactor, comprising; a melt-retention chamber, wall means defining a passageway extending between the reactor cavity underneath the reactor pressure vessel and one side of said chamber, said passageway including vent means extending through an upper wall portion thereof, said vent means being in communication with the upper region of the reactor containment building, whereby gas and steam discharged from the reactor pressure vessel are vented through said passageway and vent means into the gas escape channel means and the reactor containment building, the bottom wall of said passageway being positioned a predetermined distance below the reactor cavity and above the floor of said melt-retention chamber whereby molten material discharged from the reactor pressure vessel flows through said passageway into the lower portion of the melt-retention chamber and is retained in said lower portion by the force of gravity as gas discharged from the reactor pressure vessel is vented into the reactor containment building.

2. An invention as defined in claim 1 including first and second platforms that are mounted within the melt-retention chamber, respectively, adjacent to the side walls nearest to and farthest from said passageway, said platforms being positioned over the chamber floor and at least a selected height above the bottom of the retention chamber such that the platforms are disposed below the bottom wall of said passageway, said platforms being effective to shield from direct impingement by gases and steam flowing from the reactor cavity most of the molten core material retained on the bottom of said retention chamber.

3. An invention as defined in claim 2 including a third platform mounted in the reactor cavity above the bottom wall thereof and directly below the reactor pressure vessel, said third platform being effective to shield from direct impingement by steam and gases discharged from the reactor pressure vessel any molten core material under the third platform.

4. An invention as defined in claim 2 including at least one deflector vane that is mounted in said passageway adjacent to the top wall thereof, between the reactor cavity underneath the reactor pressure vessel and said vent means, said deflector vane being made to deflect droplets of molten core material away from the vent means to cause the deflected core material to flow through the passageway into the melt-retention chamber while enabling gas and steam to escape through the vent means into the reactor containment building.

5. An invention as defined in claim 4 including a plurality of deflector vanes each of which are mounted in said passageway adjacent to the top wall thereof, at spaced apart points thereon, between at least a portion of said vent means and the reactor cavity region just underneath the reactor pressure vessel.

6. An invention as defined in claim 4 including a grid means that is supported in said melt-retention chamber downstream from said passageway, said grid means being operable to have passed through it part of the gas discharged from the pressure vessel, through the passageway, into the upper portion of the melt-retention chamber, while diminishing the velocity of the gas thus passed through the grid means, thereby to develop a back pressure in said passageway that forces high pressure steam and gases from the passageway through the vent means into the reactor containment building.

7. An invention as defined in claim 6 wherein said grid means comprises a grid formed of a plurality of beam members that are supported in substantially parallel relation to one another, with the combined surface areas of the beam members facing the passageway being about equal to the combined area between said beam members transverse to the flow of gas discharged past the beam members into the retention chamber.

8. An invention as defined in claim 7 wherein each of said beam members is about 5 inches to 8 inches in width and wherein the beam members are spaced apart about 5 inches to 8 inches.

9. An invention as defined in claim 8 wherein the surface area of said grid beam members, combined with the areas between the grid members, is about equal to the area of a plane through said passageway transverse to the flow of discharge gas as it approaches the grid means.

10. An invention as defined in claim 7 including a plurality of ribs mounted adjacent to the bottom surface of said melt-retention chamber, between the side walls thereof, said ribs being effective to confine molten core material within the retention chamber when gases and steam flowing from the reactor cavity are passed over the ribs.

11. An invention as defined in claim 10 wherein each of said ribs extends above the bottom of said bottom surface a distance equal to about ⅔ of said selected height that said first and second platforms are mounted above said bottom surface.

12. An invention as defined in claim 10 wherein said plurality of ribs include at least 4 substantially identical ribs.

13. An invention as defined in claim 11 wherein said ribs are mounted about parallel to one another and are spaced apart at distances about equal to the height of one of said ribs.

* * * * *